UNITED STATES PATENT OFFICE.

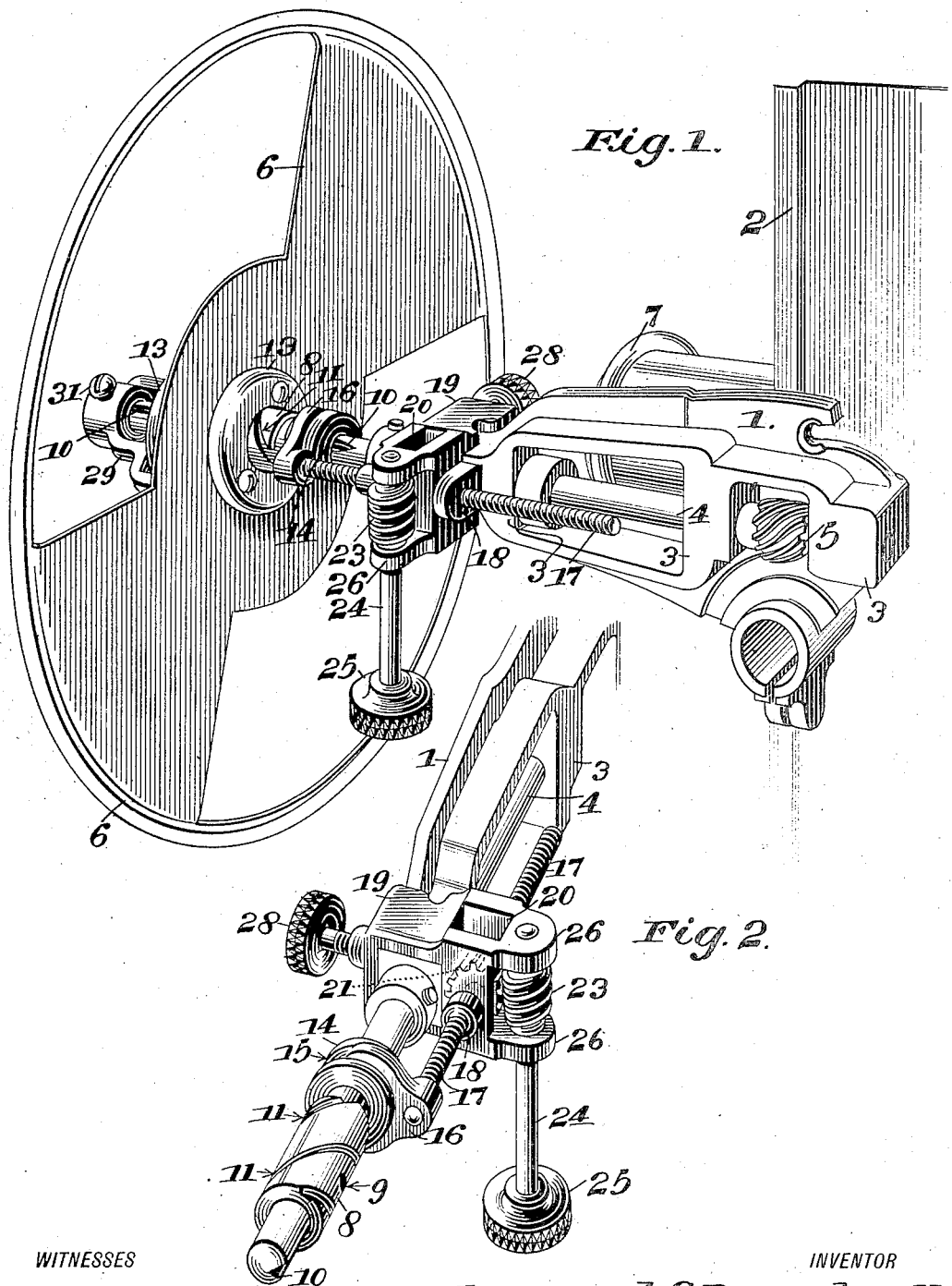

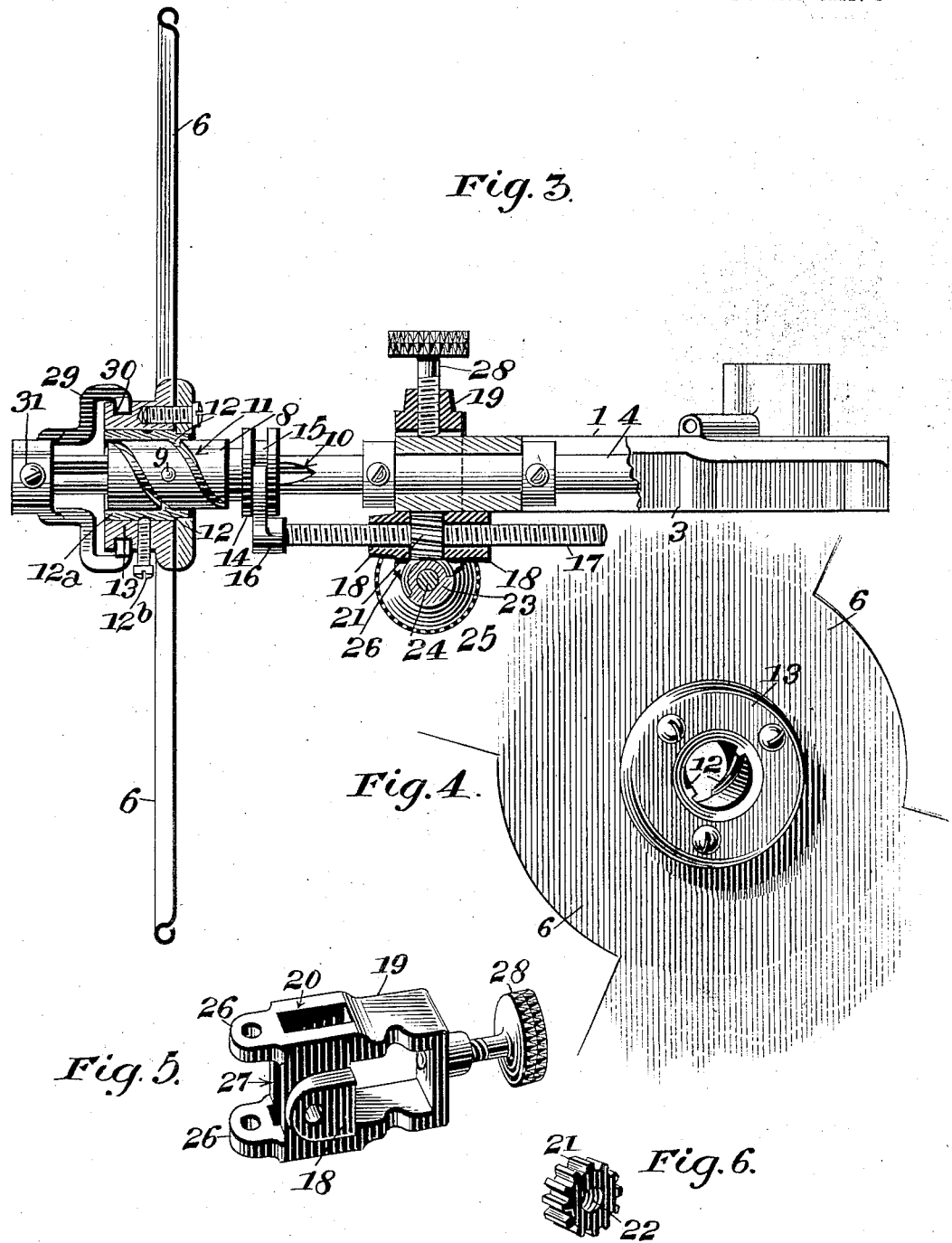

LEONARD COMBS PAGENHARDT, OF WESTERNPORT, MARYLAND.

SHUTTER-ADJUSTING DEVICE.

1,328,759.

Specification of Letters Patent. Patented Jan. 20, 1920.

Application filed August 13, 1919. Serial No. 317,219.

*To all whom it may concern:*

Be it known that I, LEONARD COMBS PAGENHARDT, a citizen of the United States, and a resident of Westernport, in the county of Allegany and State of Maryland, have made certain new and useful Improvements in Shutter-Adjusting Devices, of which the following is a specification.

My invention relates to improvements in motion picture machines, it being more particularly an improvement in the mechanism for adjusting the revolving shutter, and it consists in the constructions, combinations and arrangements herein described and claimed.

One of the foremost objects of the invention is to provide an improved shutter for motion picture machines, means being embodied for enabling certain adjustments of the shutter while in motion, thereby eliminating or overcoming a commonly known defect in the projected pictures on the screen, called "travel ghost," without interfering with the operation of the motion picture machine.

A further object of the invention is to provide a simple shutter adjusting device for motion picture machines, which is easily applied and does not require any modification of the existing motion picture machine structure in making such application.

Other objects and advantages will appear in the following specification, reference being had to the accompanying drawings, in which :—

Figure 1 is a perspective view showing the improved adjusting device applied to a revolving motion picture shutter, Fig. 2 is a detail perspective view showing the improved adjusting device mounted on the shutter shaft bracket, the revolving shutter being removed, Fig. 3 is a horizontal section, Fig. 4 is a detail perspective view of a portion of the revolving shutter and showing the hub with the spiral teeth, Fig. 5 is a detail perspective view of the mounting frame, and Fig. 6 is a detail perspective view of the feed worm pinion.

The motion picture machine, to which the improved revolving shutter adjusting device is applied, is partly shown in Fig. 1. That is to say, only so much of the machine is shown as is necesssary to illustrate the application of the invention.

The shutter shaft bracket 1 is carried by the frame or housing 2 of the motion picture machine in a manner well known by those experienced in this art. This bracket includes bearing portions 3 in which the shutter shaft 4 is journaled. The shaft carries a worm 5 which is driven by a worm gear forming a part of the machine, but not illustrated in the drawing.

The revolving shutter 6 in its chief aspect is the same as any shutter of this type now in use. The present shutter has two wings, one of which is the cut-off wing or blade, the other the flicker blade. The shutter is rapidly revolved by the shutter shaft 4 in front of the lens 7, and it is the purpose of the present invention to provide a forward or backward adjustment of the revolving shutter in the plane of rotation. This adjustment is effected while the shutter is in motion, and by enabling such adjustment of the shutter, the defect known as "travel ghost" commonly seen, particularly in the printed titles of pictures and appearing as a dim white trail, either above or below the letters, is capable of elimination.

The adjusting device comprises a feed sleeve 8, which is longitudinally slidable on the extremity of the shutter shaft 4, and has a stud 9 in engagement with the keyway 10 of the shaft 4, by means of which arrangement, the sliding function is permitted, but relative turning of the sleeve is prevented. This feed sleeve has a plurality of spiral grooves 11.

These are occupied by the spiral teeth 12 formed in a sleeve 12ª fixed in the bore of the hub 13 of the revolving shutter 6 by means of screws 12ᵇ. The purpose of the sleeve 12ª is to enable a finer adjustment by means of the knurled screw described below. The sleeve 12ª makes it possible to set the shutter nearer right in assembling the parts in the first place. The shaft 4, feed sleeve 8, and revolving shutter 6, all turn as one integral part, no relative movement of the shutter with respect to the feed sleeve 8, taking place until the adjusting function takes place. This is described below.

Integrally mounted on or carried by the feed sleeve 8 at the rear end, is the feed collar 14 which has a groove 15 for the reception of the yoke 16. The yoke 16 is carried by the feed screw 17 which passes through the smooth bores of the integral bosses 18 of the mounting frame 19.

A chamber 20 is provided in the mounting frame 19 in the vicinity of the bosses 18, as clearly shown in Figs. 2 and 5, for the accommodation of the feed worm pinion 21. The pinion 21 has a screw threaded bore 22 through which the feed screw 17 extends. The feed worm pinion has a snug fit in the chamber 20, and when the pinion is turned by means of the worm gear 23 on the end of the stem 24, the feed screw 17 is made to move either forwardly or backwardly, according to the direction of turning of the knurled head 25, thereby sliding the feed sleeve 8 in a corresponding direction. The reader will understand at once that, regarding the revolving shutter 6 as being practically stationary with respect to the shaft 4, the sliding motion of the sleeve 8 will cause a forward or backward adjustment of the shutter in the direction of rotation, by virtue of the spiral groove and teeth connections 11, 12.

Brackets 26, forming parts of the mounting frame 19, provide bearings for the stem 24 and abutment between which the worm gear 23 is located. It can be plainly seen in Fig. 2 that the feed worm pinion 21 is accessible by the gear 23 through an opening 27 in front of the frame 19 and communicating with the chamber 20.

In mounting the adjusting device the inclosed rectangular portion of the frame 19 is slipped over the square end of the shaft bracket 1, and the frame is secured in place by means of the clamp screw 28. The hub 13 of the revolving shutter 6 is threaded on the feed sleeve 8 where it is kept in position and from again threading off, by means of the spider 29 at the front.

For the purposes of accommodating the spider, the hub 13 is made with an annular groove 30 into which the ends of the arms of the spider 29 extend. The spider in turn is firmly secured on the extremity of the shutter shaft 4, by means of the screw 31. The spider 29 keeps the revolving shutter in one position in respect to the shaft 4. That is to say, the revolving shutter 6 is free to turn, but the spider keeps it from moving longitudinally of the shaft.

The operation, although described above, is again briefly reviewed here. It has just been made plain how the spider 29 keeps the revolving shutter 6 from moving lengthwise of the shutter shaft 4 but still permits free turning of the shutter. But it is not until the shutter adjusting mechanism comes into operation that there is any relative turning of the shutter in respect to the spider. Assume now that it is desired to advance or retard the revolving shutter in the direction of its rotation.

The operator turns the stem 24 by means of the knurled head 25, whereupon the gears 23, 21 are turned and consequently the feed screw 17 is advanced or moved back. The feed sleeve 8 must advance or move back accordingly, and since the feed sleeve is prevented from turning on the shaft 4 by means of the stud and key groove connections 9, 10, it naturally follows that the spiral grooves 11 will have the effect of slightly turning the revolving shutter by virtue of the engagement of the teeth 12. The adjustment of the revolving shutter by means of the knurled head 25, is very fine and the operator is enabled to accurately adjust the shutter so as to eliminate the "travel ghost" alluded to above, and so often experienced in motion picture projection.

While the construction and arrangement of the improved shutter adjusting mechanism, as herein described and claimed, is that of a generally preferred form, obviously modifications and changes can be made without departing from the spirit of the invention or the scope of the claims.

I claim:—

1. In combination with a revolving shutter shaft and a shutter carried and revolved thereby; means on the shaft by which the shutter is carried and by which adjustments of the shutter in the plane of rotation are effected, means for moving said carrying means along the axis of the shaft and thereby effecting said shutter adjustments, and means carried by the shaft in engagement with a portion of the shutter for preventing axial movement of the shutter.

2. In combination with a revolving shutter shaft and shutter revolved thereby; means on the shaft by which the shutter is carried and with which it has spiral connection, means for moving said carrying means axially of the shaft thereby adjusting the shutter relatively to the shaft in the plane of rotation, and means carried by the shaft in engagement with a portion of the shutter for preventing axial movement of the shutter.

3. In combination with a revolving shutter shaft and shutter; means mounted to slide but not rotate on the shaft by which the shutter is carried, including spiral connections with the hub of the shutter; stationary mounting means, instrumentalities operatively associated with both the mounting and carrying means whereby the latter is axially slid on the shaft to effect adjustment of the shutter in the plane of rotation by virtue of the spiral connection, and means engaging a portion of the shutter hub to prevent axial movement of the shutter.

4. In combination with a rotating shutter shaft and shutter; a non-rotatably but axially movable sleeve on the shaft with spiral grooves, means relatively stationary in respect to the shaft but operatively associated with the sleeve to slide the same and adjust the shutter in the plane of rotation, the shutter having a hub arranged to receive the spiral groove; and means carried by the shaft in engagement with the hub preventing endwise movement of the shutter but permitting said shutter adjustments.

5. The combination, of a revolving member, an axially stationed shutter revoluble therewith, and a member movable between the revoluble member and shutter, with inter-associated means to cause relative circular adjustment of the shutter by such movement.

6. Means for mounting shutter adjusting mechanism on a bracket, comprising a frame with a rectangular portion having means for securing it in place on the bracket, and including a chambered portion with adjacent lugs having smooth bores, respectively for housing a feed worm pinion and receiving a feed screw.

7. Motion picture machine shutter adjusting means, comprising a shutter hub with spiral teeth, a feed sleeve with spiral grooves to receive the teeth, non-rotatably but axially slidably applicable to a revolving shutter shaft; means including a spider for preventing endwise movement of the hub and shutter in respect to the sleeve and shaft, a chambered and bracketed mounting frame with clamping means for fixedly applying the frame to the shutter brackets, including bosses with smooth bores adjacent the chambered portion; a feed screw passing through the bosses with means for operatively engaging the feed sleeve, a feed worm pinion in the mounting frame chamber with a threaded bore to receive the screw, and an actuating and engaging worm gear on a stem journaled in said bracket.

8. Motion picture machine shutter adjusting means, comprising a shutter hub, a sleeve with spiral teeth occupying a bore in the hub, and means for adjustably retaining the sleeve in the bore.

9. The combination in shutter adjusting means, of a revolving member, a non-axially movable shutter revoluble with said member, and a sleeve axially movable between the shaft and shutter, with cam groove and lug connections to cause relative circular shutter adjustment by such movement.

10. The combination in shutter adjusting means, of a revolving member, a shutter, turning with said member, with member-carried means preventing axial movement; and a sleeve axially slidable between the shaft and shutter, with mutually associated means for circularly adjusting the shutter during such sliding.

11. In combination with a revolving shutter shaft, a relatively non-rotatable spirally grooved sleeve on the shaft; a shutter supported on the sleeve with a tooth in the groove, means to slide the sleeve axially and by said groove and tooth to adjust the shutter circularly and means adjustably fixed on the shaft to hold the shutter from axial movement but permit such circular adjustment.

LEONARD COMBS PAGENHARDT.